F. A. COOK.
TYPE WRITING MACHINE.
APPLICATION FILED DEC. 5, 1916.

1,306,950.

Patented June 17, 1919.
2 SHEETS—SHEET 1.

WITNESSES:

INVENTOR:
Frank A Cook
BY
ATTORNEY.

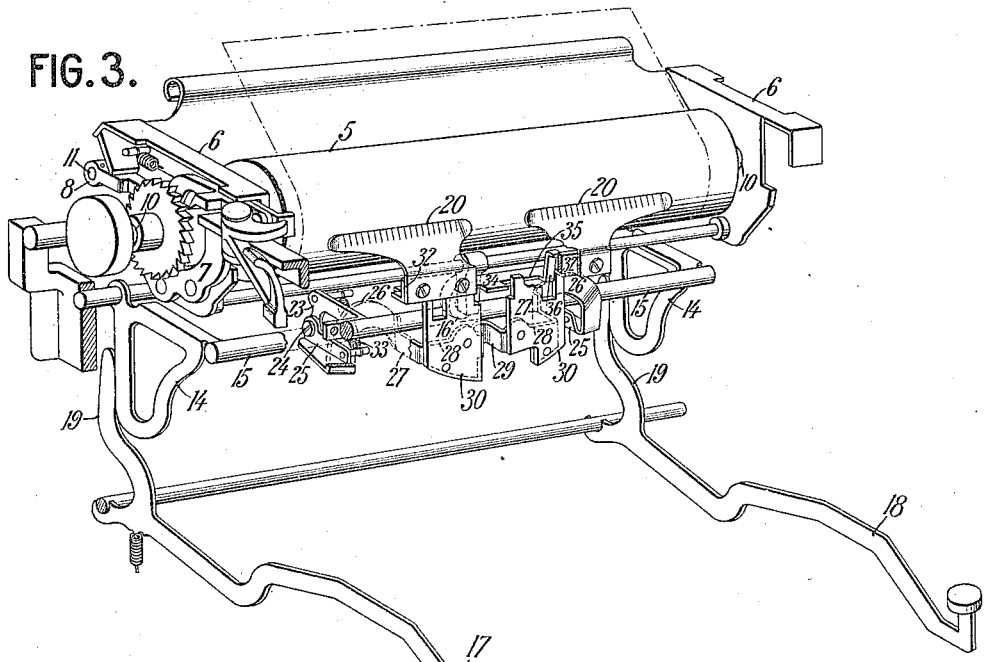
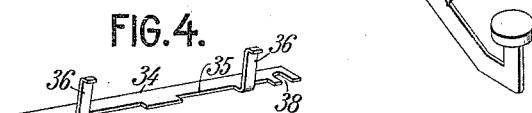
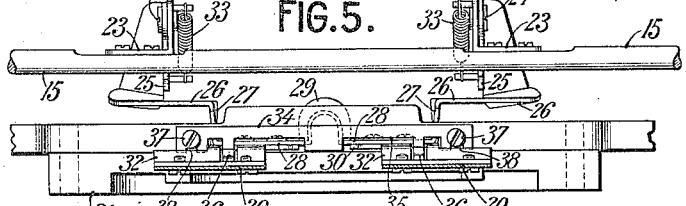
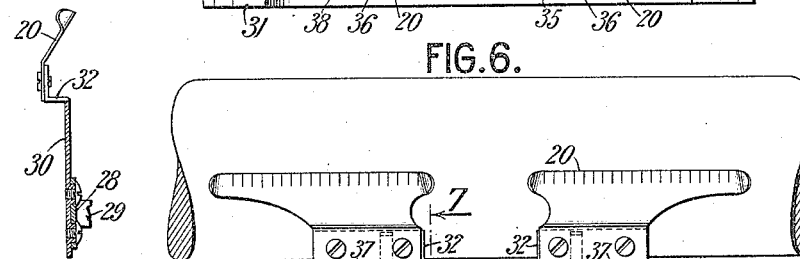
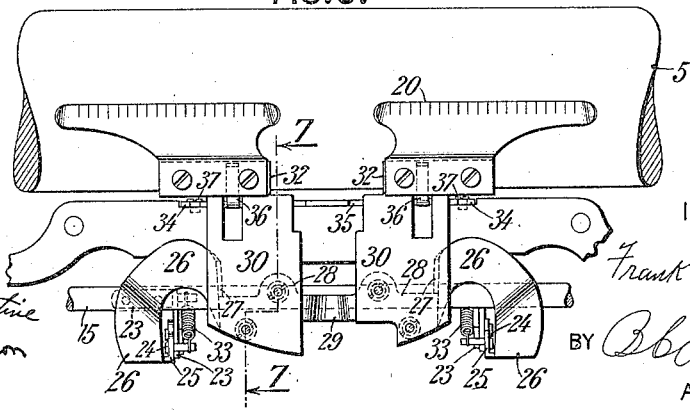

UNITED STATES PATENT OFFICE.

FRANK A. COOK, OF HARTFORD, CONNECTICUT, ASSIGNOR TO UNDERWOOD TYPEWRITER COMPANY, OF NEW YORK, N. Y., A CORPORATION OF DELAWARE.

TYPE-WRITING MACHINE.

1,306,950.   Specification of Letters Patent.   Patented June 17, 1919.

Application filed December 5, 1916. Serial No. 135,180.

*To all whom it may concern:*

Be it known that I, FRANK A. COOK, a citizen of the United States, residing in Hartford, in the county of Hartford and State of Connecticut, have invented certain new and useful Improvements in Type-Writing Machines, of which the following is a specification.

This invention relates to line gages and work-sheet holders, and is an improvement on the application of Alfred G. F. Kurowski, Serial No. 55,917, filed October 15, 1915 (now Patent No. 1,220,647, dated March 27, 1917).

The line gage may be used to assist in holding a work-member, such as an index or show-card type, on the platen. This is needed where it is desired to write on the very last line of the card, and especially where it has considerable stiffness, tending to cause it to spring away from the platen. Inasmuch as the platen may be moved to upper-case position, it would ordinarily move away from the line gage, which is not directly connected to the platen, but is stationary and does not therefore travel longitudinally with the platen. In the present invention, the line gage is mounted so as to move from lower to upper-case position with the platen, and maintain the same relative relation as to their elevation. That is to say, the device will serve as a line gage and a card-holder in both upper-case position and lower-case position, so that the shift will not interfere with the proper adjustment of the work-member on the platen.

In the present improvement, the line gage is mounted on the shift frame, which adjusts the platen frame between upper and lower-case positions. The extent of movement of the line gage is calculated to correspond with the extent of movement of the cylindrical element of the platen at the line of writing. The line gage has a sliding vertical movement, whereas the platen-shift frame has a swinging movement. A spring means is provided for allowing for this difference in character of movement.

Other features and advantages will hereinafter appear.

In the accompanying drawings,

Fig. 3 is a skeleton perspective view of the platen and line gage showing the relation to the case-shift mechanism.

Fig. 4 is a detailed perspective view of the guide bar coöperating with the line gage supporting means.

Fig. 5 is a horizontal cross-section showing the manner of supporting the line gage on the case-shift rail.

Fig. 6 is an enlarged front view of the line gage and its supporting means.

Fig. 7 is a vertical section on the line 7—7 of Fig. 6, showing the means of mounting the wing scales on the breast plates.

Figure 1:
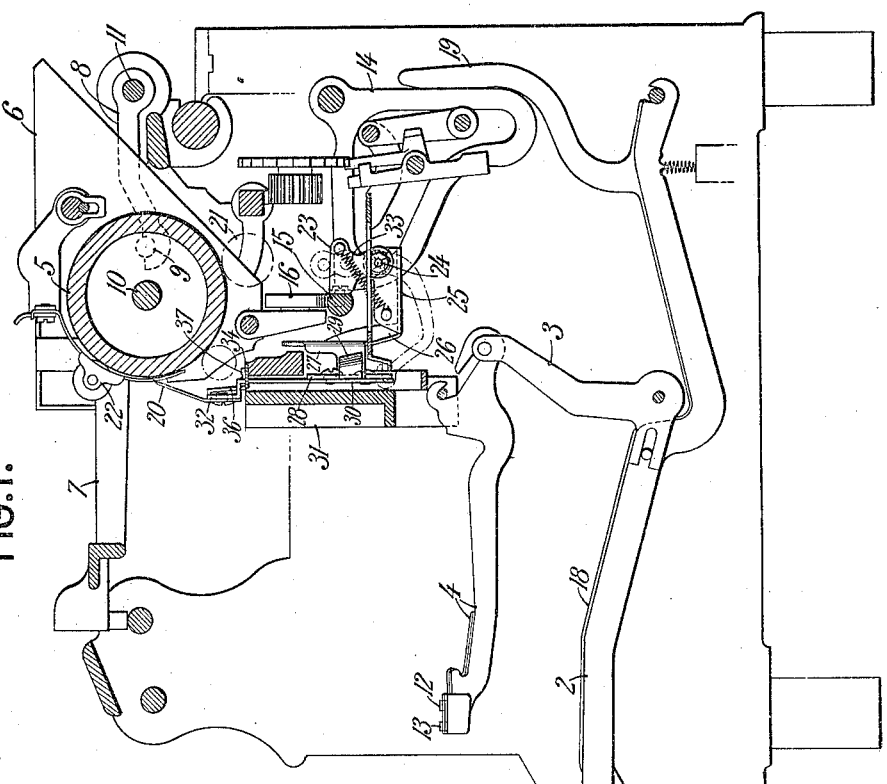
Figure 1 is a vertical section taken from front to rear through the typewriting machine, showing the platen and shifting parts therefor in the lower-case position.
Figure 2:
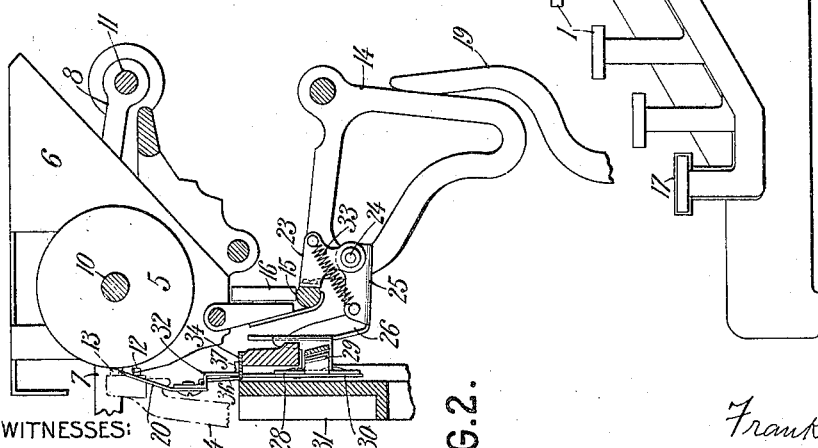
Fig. 2 is a section of a fragment of the parts shown in Fig. 1, showing the platen and shifting mechanism therefor in its upper-case position. The line gage is also shown in its corresponding upper-case position.

Referring more particularly to certain parts as embodied in the form shown in the drawings, numeral and alphabet keys 1 depress key-levers 2, to rock bell-cranks 3, to swing type-bars 4, up rearwardly against the front side of a platen 5. The platen 5 is mounted to rotate in a platen-supporting frame 6, which is supported for vertical movement in a carriage 7. The platen-supporting frame 6 is mounted on arms 8, one at each side of the carriage-frame which engage pins 9, located somewhat to the rear of the shaft 10 about which the platen rotates. The arms 8 are fast on an axle or rod 11 journaled at the rear of the carriage, so that when the platen-frame 6 is moved up and down, the cylindrical element at the line of printing on the platen will move substantially vertical, so as to present the same cylindrical element to either one of two sets of characters 12 and 13 on the type-bars 4. These characters, 12 and 13, are the lower and upper-case characters respectively. The platen 5 and its supporting frame 6 are moved vertically by means of a shift-frame 14, which is provided with a shift-rail 15, on which travels a roller 16 mounted on the platen frame 6. This enables the platen-supporting frame 6 to be moved vertically in any position of the travel of the carriage 7. The platen-shift frame 14 may be operated in any usual way, such as, by either a temporary shift-key 17 or a semipermanent shift-key 18. These shift keys are provided with upwardly extending arms 19, which engage in back of the platen-shift frame 6, so as to rock the shift-frame forwardly and upwardly.

In order to justify the typewriting on the work-sheet on the platen, both as to the line and along the line, there is provided a line gage 20, which is shown in the form of two wings spaced apart, so as to permit the type-bars 4 to strike between them. These wings are provided with scales, along their upper edges, to aid in adjustments along the line of writing. The work-member is held on the platen by the usual pressure rollers (shown dotted at 21 in Fig. 1). In the case of stiff show-cards and other difficult work-members, additional holding means may be provided in the nature of an overhead guide 22 provided with the pressure rollers. In order, however, to hold the work-member, and especially in the case of a stiff card, snug on the platen up to the very last line of writing thereon, and even to the bottom edge, use is made of the gage 20, which at its upper edge engages the work-member and the platen on the very last line of writing. That is to say, this gage is made to hug the platen close enough to grip the work-member between its edges and the surface of the platen.

The platen travels along step by step with the carriage in the usual manner, so that it has a longitudinal movement relative to the line gage, which in this instance is also a card-holder. In many former types of machines, the platen also has a vertical movement relative to the line gage when shifting between upper and lower-case positions. The present invention, however, is intended to do away with this relative vertical movement, so that the line gage will form as good a line gage and a positive holder in upper-case position of the platen as well as in lower-case position thereof. To do this, there are provided on the shift rail 15, of the platen-shift frame 14, two brackets 23 spaced apart from each other. These brackets extend rearwardly and downwardly to form pivotal supports at 24 for a pair of forwardly extending arms 25. These arms arch upwardly and inwardly toward each other, to form rises 26 and then extend forwardly at 27, where they are joined by a cross-bar 28 forming a warped bail. The cross-bar 28 is arched rearwardly at 29, to form leeway for the vibrating part of the ribbon mechanism. On supporting lengths of the cross-bar 28 on either side of the bow 29, two rigid breast plates 30 are mounted, as indicated in Fig. 7. These breast plates extend upwardly through a segment 31, which supports the type-bars 4, and are provided at their upper ends with angle irons 32. The wings of the line gage 20 are each supported by one of these angle irons.

In order to maintain the combined line gage and cardholder in intimate contact with the platen, and to allow for the different type of movement of the supporting mechanism for the line gage from that of the swinging shift frame 14, there are provided a pair of springs 33 extending diagonally between the brackets 23 and the arms 25 above the pivots 24.

To guide the supporting elements of the line gage and to limit the inward movement thereof, there is provided a guide bar 34, which is located between the platen and the support for the line gage and mounted on the top of the segment 31. This guide bar 34 is recessed at 35 to receive the breast plates 30, and is provided with upwardly and forwardly extending lugs 36, to limit the inward movement of the line gage toward the platen at points nearer the engaging edges thereon. This prevents the line gage digging into the surface of the platen too harshly, and justifies the vertical sliding movement of the line gage in shifting from one case position to the other. The ends of the wing scales of the line gage are dished upwardly, so as to permit the platen to slide lengthwise thereof easily, and to enable the line gage to be cammed forwardly against the tension of the springs 33, in case of engagement with any of the mechanism on the platen and carriage frame. The guide bar 34 is adjustably attached to the segment 31 by screws 37 extending in open-ended slots 38, so that the amount of pressure on engagement with the platen can be accurately adjusted.

The operation of the device will be readily understood from the above description. When writing in lower case, the parts will be in the position indicated in Fig. 1, with the line gage forming a holder assisting in maintaining a work-member snug on the platen. When one of the shift keys 17 or 18 is depressed to write with upper case characters, the shift frame 14 will be rocked about its pivot to force the platen frame 6 upwardly. The combined mounting of the platen frame 6, by means of the arms 8 connected to the carriage 7, and the rollers 16 resting on the shift rail 15, enables the platen to move substantially vertical, or at any rate, so that the cylindrical element of the platen at the line of writing will assume a position in upper-case writing, substantially directly over the position thereof for lower-case writing. The pivots 24 are so located that the line gage, which has a vertical sliding movement, will move at its edge of contact substantially the same distance as the cylindrical element of the platen, that constitutes the line of printing, moves. The springs 33 allow for any variations due to the change from outward motion of the platen-shift frame to rectilinear motion of the line gage and the parts supporting the same.

It will be seen, that the line gage cardholder and the parts supporting the same do not interfere in any way with either vertical or horizontal movements of the platen, or with movements of the type actions and other parts actuated thereby.

Variations may be resorted to within the scope of the invention, and portions of the improvements may be used without others.

Having thus described my invention, I claim:

1. The combination of a carriage, a platen and a shiftable platen frame on said carriage, a shift-frame pivoted upon the framework of the machine, a combined line-gage and work-holder for said platen, means whereby said work-holder is pivotally supported upon said shift-frame below said platen, and a spring tending to turn said work-holder about its pivot, for maintaining said work-holder in close juxtaposition to said platen in both positions to which it is shifted.

2. The combination with a platen, of a gage adapted to coöperate with said platen to hold a work-member tight on said platen, a support for said gage, and a guide-bar having upwardly and forwardly extending lugs to limit the movement of said gage toward said platen.

3. The combination with a platen, of wings coöperating with said platen, a support uniting said wings to move in unison, and an adjustable guide-bar having a pair of spaced lugs extending upwardly and forwardly thereof, to accurately limit the closeness of said wings to said platen.

4. The combination with a platen, of a shift rail for said platen, brackets on said shift rail, a pair of arms pivotally connected to said brackets, a pair of risers extending upwardly from said arms, forward extensions connected to said risers, a cross-bar connected to said extensions, and a two-part gage mounted on said cross-bar and coöperating with said platen.

5. The combination with a platen, of a gage coöperating with the platen and comprising two wings, a bail supporting said wings comprising a pair of arms, a pair of risers arching upwardly from said arms, extensions projecting forwardly from said risers, a cross-bar connecting said extensions, and a common shift rail for said platen and said bail enabling corresponding movements of said platen and said wings.

6. The combination with a pivoted shift frame including a platen, of a separate pivoted frame for shifting said platen, a paper-holding gage pivoted to said last-named frame, a spring tending to move said gage with the first-named frame, and an adjustable guide for said gage to cause it to follow the platen.

7. The combination with a pivoted shift frame including a platen, of a separate pivoted frame for shifting said platen, a paper-holding gage pivoted to said last-named frame, a spring tending to move said gage with the first-named frame, a fixed type-bar segment in which said gage is mounted, and lugs on said segment adapted to project into slots on said gage to guide it.

8. The combination with a shift carriage including a platen, of a pivoted frame for shifting said shift carriage, a paper-holding gage pivoted to said shift frame, a spring anchored in said shift frame and tending to draw said gage with it, and an adjustable fixed guide for guiding said gage.

9. The combination with a shift carriage including a platen, of a pivoted shift frame for shifting said platen, a type-bar segment, a gage pivoted to said pivoted frame and extending through said segment and guided thereby, an a spring joining said gage to said pivoted frame adapted to cause the gage to move with the platen.

FRANK A. COOK.

Witnesses:
W. M. BYORKMAN,
LYMAN D. BROUGHTON.

Copies of this patent may be obtained for five cents each, by addressing the "Commissioner of Patents, Washington, D. C."